United States Patent [19]

Sicree et al.

[11] 3,929,832

[45] Dec. 30, 1975

[54] 2,3,7,8-TETRAAMINODIBENZOTHIO-PHENE 5,5-DIOXIDE AND PROCESS THEREFOR

[75] Inventors: Albert J. Sicree, Dayton; Fred E. Arnold, Centerville, both of Ohio

[73] Assignee: The United States of America as represented by the Secretary of the Air Force, Washington, D.C.

[22] Filed: Nov. 22, 1974

[21] Appl. No.: 526,191

Related U.S. Application Data

[62] Division of Ser. No. 371,089, June 18, 1973, Pat. No. 3,865,841.

[52] U.S. Cl. ............................................ 260/329.3
[51] Int. Cl.$^2$ ...................................... C07D 333/76
[58] Field of Search ................................. 260/329.3

[56] References Cited
UNITED STATES PATENTS 2,529,860   11/1950   Amstutz............................ 260/329.3
2,752,333   6/1956   Lecher et al..................... 260/329.3

*Primary Examiner*—Sherman D. Winters
*Attorney, Agent, or Firm*—Joseph E. Rusz; Cedric H. Kuhn

[57] ABSTRACT

Benzothiophenedioxideisoquinoline ladder polymers are synthesized by the condensation of 2,3,7,8-tetraaminodibenzothiophene-5,5-dioxide with an aromatic tetracarboxylic acid or dianhydride thereof. The highly fused, aromatic-heterocyclic polymers so prepared have a high degree of thermal stability, a property that renders them particularly useful for high temperature applications, such as for plastic composites, fibrous materials and protective coatings.

2 Claims, 1 Drawing Figure

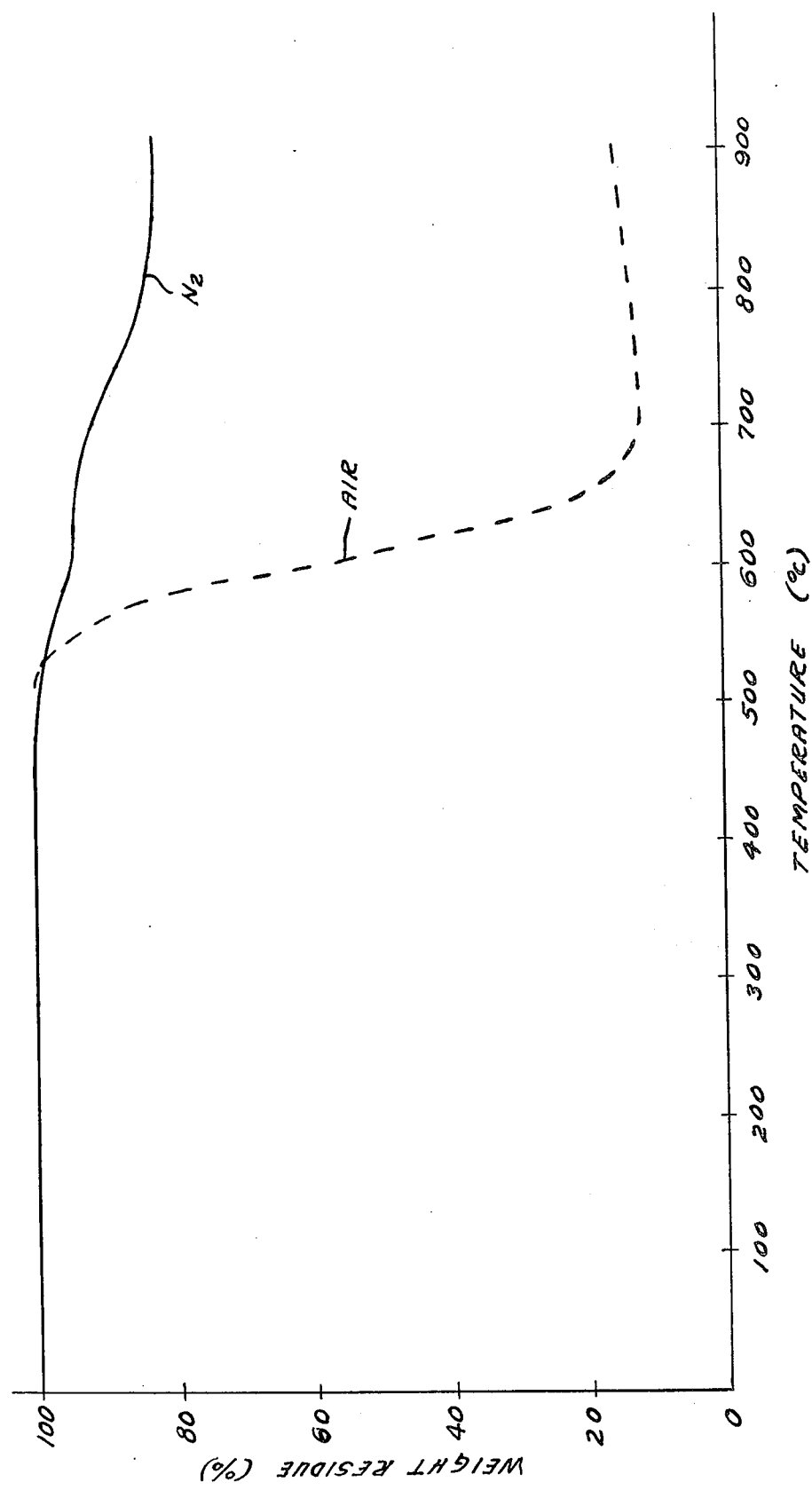

3,929,832

2,3,7,8-TETRAAMINODIBENZOTHIOPHENE 5,5-DIOXIDE AND PROCESS THEREFOR

RIGHTS OF THE GOVERNMENT

The invention described herein may be manufactured and used by or for the Government of the United States for all governmental purposes without the payment of any royalty.

This application is a division of copending U.S. Application Ser. No. 371,089, filed on June 18, 1973, and now U.S. Pat. No. 3,865,841.

FIELD OF THE INVENTION

The invention relates to polymeric compositions possessing high thermal stability. In one aspect it relates to a process for preparing the polymers. In another aspect it relates to a novel tetraamino compound for use in synthesizing the polymers.

BACKGROUND OF THE INVENTION

A great deal of research has been conducted in recent years with the object of producing materials which are chemically and physically stable at elevated temperatures. The need for such materials has been accelerated as a result of their usefulness in aerospace applications, such as in the fabrication of nose cones and heat shields for space vehicles, rocket engine components, protective clothing and the like. Much of the research work has involved the synthesis of so-called ladder or double strand polymers. Because of the structure of these polymers, they are able to sustain several bond scissions along their backbones without breakdown of the polymers. Consequently, the polymers are able to withstand temperatures which would cause the deterioration of single strand polymers.

Several ladder polymers, prepared by the polycondensation of an aromatic tetracarboxylic acid and a tetraamine, are described in the literature. For example F. E. Arnold and R. L. VanDeusen in the Journal of Polymer Science, 6, 815(1968) disclose the synthesis of ladder polymers by the reaction of 1,4,5,8-naphthalene tetracarboxylic acid with 1,4,5,8-tetraaminonaphthalene. In Macromolecules, 2, 497, these same authors disclose the preparation of ladder polymers by the condensation of 1,4,5,8-naphthalene tetracarboxylic acid with 1,2,4,5-tetraaminobenzene. Other ladder polymers are disclosed by Dawans and Marvel in the Journal of Polymer Science, A3,3549 (1965), by Bell and Pezdirtz in the Journal of Polymer Science, B3,977 (1965), and by Paufler in U.S. Pat. no. 3,414,543. The prior art polymers have not proven to be entirely satisfactory for several reasons, depending generally upon the reactants utilized. These deficiencies include the production of polymers of too low molecular weight and unsatisfactory stability at elevated temperatures as well as difficulty in the synthesis of the polymers.

It is an object of this invention, therefore, to provide improved thermally stable ladder polymers.

Another object of the invention is to provide a method whereby ladder polymers are readily synthesized.

Still another object of the invention is to provide ladder polymers from which fibers and films can be formed.

A further object of the invention is to provide a novel tetramino compound for use in the synthesis of ladder polymers.

A still further object of the invention is to provide a process for preparing the novel tetraamino compound.

Other objects and advantages of the invention will become apparent to those skilled in the art upon consideration of the accompanying disclosure and the drawing which is a graph showing the results of thermal gravimetric analysis of a polymer of this invention.

SUMMARY OF THE INVENTION

The present invention resides in a thermally stable polymer composition which is film and fiber forming and consists essentially of recurring units having the following formula:

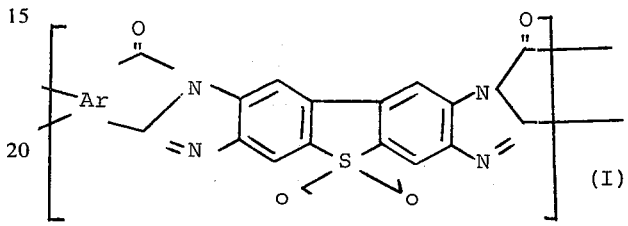

wherein Ar is a tetravalent aromatic radical. The following are examples of tetravalent aromatic radicals:

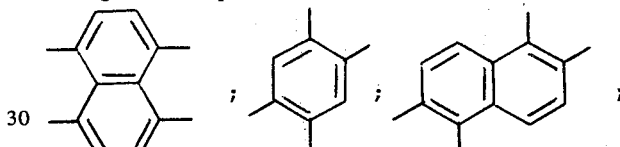

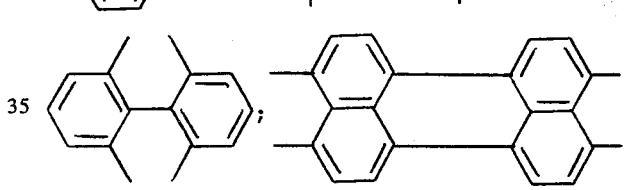

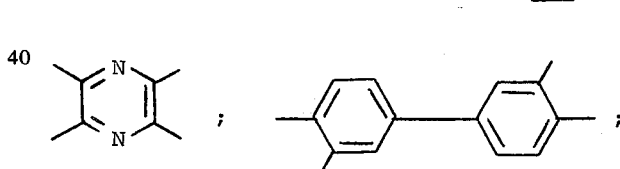

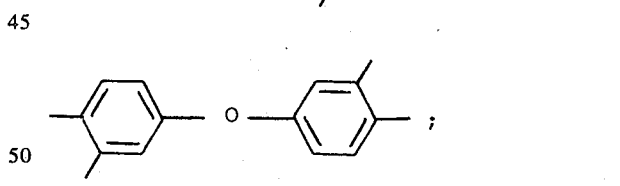

and

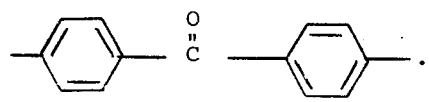

Of the polymers containing the aforementioned repeating units, those in which Ar is 1,4,5,8-naphthalene are preferred. There are generally at least 50 and preferably at least 100 of the repeating units. In general, the number of repeating units is such that the polymer has an intrinsic viscosity of about 0.75 to 3.0 dl/g in methane sulfonic acid.

In one embodiment, the present invention resides in a process for preparing the benzothiophenedioxideisoquinoline polymers. Thus, the polymers are synthesized by the condensation of 2,3,7,8-tetraaminodibenzothiophene-5,5-dioxide with an aromatic tetracarboxylic acid or a corresponding dianhydride. The condensation reaction involved is illustrated by the following equation:

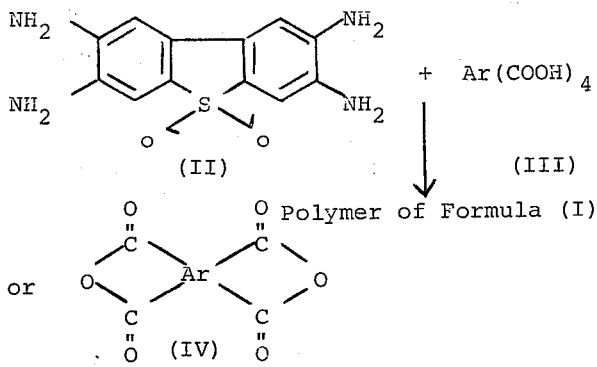

In the foregoing equation, Ar is as indicated hereinabove.

The condensation reaction depicted by the above equation is conducted in polyphosphoric acid or in a fused inorganic salt, such as antimony trichloride or bismuth trichloride. When an aromatic tetracarboxylic acid is used, it is usually preferred to conduct the polymerization reaction in polyphosphoric acid. The fused salts are generally preferred when a dianhydride is employed as one of the reactants. When utilizing polyphosphoric acid as the reaction medium, the condensation reaction is generally conducted in an inert atmosphere at a temperature ranging from about 100° to 250°C for a period of about 5 to 20 hours. The reaction is usually carried out in an inert atmosphere at a temperature in the range of about 60° to 180°C for a period of about 5 to 20 hours when employing a fused salt as the reaction medium. While high molecular weight polymers are obtained when using either type of solvent, it is often preferred to conduct the reaction in a fused salt, utilizing a dianhydride as one of the reactants. This is because the fused salts are not polymeric as is polyphosphoric acid, thereby obviating any difficulty in stirring the reaction mixture and concomitantly permitting higher concentrations of reactants. Furthermore, the dianhydrides have a longer shelf-life and can be obtained in a higher degree of purity than the tetraacids.

Any suitable inert gas can be used in the practice of the process. Examples of such gases include nitrogen, argon, helium, and the like.

Examples of aromatic tetracarboxylic acids (Formula III) that can be used include 1,2,4,5-benzenetetracarboxylic acid; 1,2,6,7-pyrenetetracarboxylic acid; o,o',o'-diphenyltetracarboxylic acid; 1,2,5,6-naphthalenetetracarboxylic acid; 3,4,9,10-perylenetetraacid; pyrazenetetraacid; 3,4,3',4'-diphenyltetraacid; 3,4,3',4'-diphenyloxidetetraacid; 3,4,3',4'-diphenylketonetetraacid; and the like. The corresponding dianhydrides of the aforementioned carboxylic acids are examples of compounds of Formula IV that can be used. It is often preferred to utilize 1,4,5,8-naphthalenetetracarboxylic acid or the dianhydride thereof. The aromatic tetracarboxylic acids and their corresponding dianhydrides are well known compounds that are described in the literature.

In the preparation of the polymers of this invention as described above, the reactants are usually employed in equimolar amounts. While a small excess of one of the reactants is not detrimental to the condensation reaction, a considerable excess results in the production of lower molecular weight products.

In recovering the polymer product, the reaction mixture is cooled, e.g., to room temperature, at the end of the reaction period. The reaction mixture is then poured into a non-solvent for the polymer, such as an alcohol or a weak acid, thereby causing the polymer to precipitate from solution. After recovery of the polymer, as by filtration or decantation, it is washed, e.g., with an alcohol, a weak acid or a mixture thereof, and then dried under a vacuum at a temperature ranging from about 70° to 100°C. The dried polymer is then purified by dissolving the polymer in a solvent therefor, such as methane sulfonic acid. Thereafter, the solution is added to a non-solvent, such as an alcohol, so as to precipitate the polymer from solution. After separation of the precipitated polymer, it is generally dried under a vacuum, thereby yielding a purified polymer product. It is to be understood that modifications in the recovery procedure can be followed without departing from the spirit and scope of the invention. For example, the precipitation of the polymer from solution can be repeated one or more times in order to further purify the polymer.

The 2,3,7,8-tetraaminodibenzothiophene-5,5-dioxide, used as a monomer in synthesizing the polymers of this invention, is prepared by a method involving four synthetic reactions. Firstly, in a sulfocyclization reaction, 2,8-dichloro-3,7-diaminodibenzothiophene-5,5-dioxide is prepared by adding 3,3'-dichlorobenzidine dihydrochloride to fuming sulfuric acid. The sulfuric acid is at a temperature of 0°C or below, and the solid dihydrochloride is added slowly so as to maintain the temperature of the reaction mixture in the range of 5° to 15°C. Upon completion of the addition, the reaction mixture is heated to a temperature ranging from 50° to 100°C for a period of 10 to 20 hours. The reaction is then rapidly cooled so as to precipitate the product which can then be purified by washing, drying and recrystallization from a solvent therefor.

Secondly, the 2,8-dichloro-3,7-diaminodibenzothiophene-5,5-dioxide, in an oxidation reaction, is converted to 2,8-dichloro-3,7-dinitrodibenzothiophene-5,5-dioxide. This is accomplished by initially adding trifluoroacticanhydride to methylene chloride containing hydrogen peroxide while maintaining the temperature of the mixture below about 35°C. To this mixture there is then added the 2,8-dichloro-3,7-diaminodibenzothiophene-5,5-dioxide, and the resulting mixture is refluxed for a period of 8 to 12 hours. Upon cooling to room temperature, the product crystallizes from solution. The product so prepared is conveniently purified by initially washing with water and drying followed by pouring a solution of the dried product in tetrahydrofuran onto an alumina chromatographic column using tetrahydrofuran as the elution solvent. After removal of the tetrahydrofuran under reduced pressure a purified product is obtained.

Thirdly, the 2,8-dichloro-3,7-dinitrodibenzothiophene-5,5-dioxide, prepared as described in the preceding paragraph, is converted in an amination reaction to 2,8-diamino-3,7-dinitrodibenzothiophene-5,5-dioxide. Thus, 2,8-dichloro-3,7-dinitrodibenzothiophene-5,5-dioxide, dioxane and concentrated ammonium hydroxide are added to a pressure vessel. After sealing the vessel, it is slowly heated to about 130° to 150°C and allowed to remain at a temperature in this range for from about 12 to 20 hours. Thereafter, the vessel is allowed to cool to room temperature, and the solid product formed therein is recovered as by filtration. The product is then purified by washing and drying followed by recrystallization from a solvent therefor.

Fourthly, the product prepared as described in the preceding paragraph is converted by reduction to 2,3,7,8-tetraaminodibenzothiophene-5,5-dioxide. Thus, 2,8-diamino-3,7-dinitrodibenzothiophene-5,5-dioxide is added to a solution of concentrated hydrochloric acid. The resulting mixture is heated at a temperature ranging from about 60° to 75°C for a period of about 3 to 6 hours. Upon cooling, e.g., to 0°C, the dihydrochloride precipitates from solution. After recovering the dihydrochloride as by filtration, it is dissolved in aqueous methanol and concentrated hydrochloric acid is added to the resulting solution. The solution is then cooled, producing needles of the dihydrochloride salt which are collected and pressed dry under a stream of an inert gas. After suspending the salt is deoxygenated water, ammonium carbonate is added thereto, thereby forming the tetraamine product. The product can be purified by recrystallization from deoxygenated water.

A more complete understanding of the invention can be obtained by referring to the following illustrative examples which are not intended, however to be unduly limitative of the invention.

EXAMPLE I

Preparation of 2,3,7,8-tetraaminodibenzothiophene-5,5-dioxide a. 2,8-Dichloro-3,7-diaminodibenzothiophene-5,5-dioxide To 150 ml of 30% fuming sulfuric acid at 0°C there was added 50 g (0.153 mol) of solid 3,3'-dichlorobenzidine dihydrochloride. The solid was added in small quantities in order to maintain the temperature between 5° and 15°C. After completion of the addition, the mixture was heated to 75°C and maintained at that temperature for 15 hours. The solution was then allowed to cool to 30°C after which it was poured on 5 kg of ice to precipitate the compound. The yellow precipitate was collected, washed first with water and then with an 8% ammonium carbonate solution, and finally air dried. The product was recrystallized from m-cresol, giving 40 g (83% yield) of small yellow crystals which did not melt when heated up to 400°C.

Analysis: Calc'd for $C_{15}H_8N_2Cl_2O_2A$ : C,45.72; H,2.56; N, 8.89; Found: C,45.69; H,2.49, N, 8.31.

b. 2,8-Dichloro-3,7-dinitrodibenzothiophene-5,5-dioxide

To 200 ml of methylene chloride containing 10 ml of 90% hydrogen peroxide there was added dropwise 45 ml of trifluoroacticanhydride. The temperature of the mixture was not allowed to exceed 35°C during the addition of the anhydride. Ten grams (0.0317 mol) of the 2,8-dichloro-3,7-diaminodibenzothiophene-5,5-dioxide was then added to the mixture. The resulting mixture was heated to reflux temperature and refluxed for a period of 10 hours. Upon cooling to room temperature, a bright yellow material crystallized from solution. The material was collected, washed with water and then air dried. The dried yellow material was dissolved in tetrahydrofuran and poured onto a 1 foot alumina column, using tetrahydrofuran as the elution solvent. The tetrahydrofuran was removed under reduced pressure to give 6.2 g (52% yield) of bright yellow crystals (m.p. 321°–322°C).

Analysis: Calc'd for $C_{12}H_4N_2O_6SCl_2$: C,38.42; H,1.07; N,7.49; Found: C,38.53; H,1.45; N,7.38.

c. 2,8-Diamino-3,7-dinitrodibenzothiophene-5,5-dioxide

There was added to a pressure bottle 40 ml of p-dioxane, 10 ml of concentrated ammonium hydroxide, and 5 g (0.131 mol) of 2,8-dichloro-3,7-dinitrodibenzothiophene-5,5-dioxide. The bottle was sealed and slowly heated to 140°C. After 15 hours at 140°C, the pressure bottle was allowed to cool to room temperature. The orange solid that precipitated from solution was recovered by filtration. The material was washed with water, dried under reduced pressure, and recrystallized from nitrobenzene to provide 3,8 g (86% yield) of the product (m.p. >400°C).

Analysis: Calc'd for $C_{12}H_8N_4O_6S$: C,42.86; H,2.39; N,16.66; Found: C,42.76; H,2.39; N,16.16.

b. 2,3,7,8-Tetraaminodibenzothiophene-5,5-dioxide

To a solution of 33 g (0.148 mol) of concentrated hydrochloric acid there was added 5 g (0.148 mol) of 2,8-diamino-3,7-dinitrodibenzothiophene-5,5-dioxide at such a rate as to maintain the temperature at 60° to 70°C. The mixture was heated for 4 hours at a temperature in the range of 65° to 70°C and then cooled to 0°C, thereby precipitating the dihydrochloride as a gray solid. The dihydrochloride was recovered by filtration and dissolved in 300 ml of 50% aqueous methanol. Concentrated hydrochloric acid in the amount of 300 ml was added to the solution. Cooling produced white needles of the dihydrochloride salt which were collected and pressed dry while under a stream of nitrogen. The salt was then suspended in deoxygenated water and ammonium carbonate was added to free 4.5 g (87% yield) of the tetraamine product (m.p. >300°C). The product was purified by recrystallization from deoxygenated water.

Analysis: Calc'd for $C_{12}H_{12}N_4SO_2$: C,52.00; H,4.65; N,20.21; S,11.57; Found: C,52.12; H,4.72; N,19.88; S,11.62.

EXAMPLE II

A mixture of 1.52 g (0.005 mol) of 1,4,5,8-naphthalenetetracarboxylic acid and 1.385 g (0.005 mol) of 2,3,7,8-tetraaminodibenzothiophene-5,5-dioxide was added to 100 ml of deoxygenated polyphosphoric acid at room temperature. The mixture was gradually heated to 185°C over a period of 6 hours and maintained at 185°C for 10 hours. The product was recovered by pouring the cooled reaction mixture into 2 liters of well stirred methanol. The filtered product was thoroughly washed with boiling methanol and dried at 80°C under reduced pressure for 24 hours to give 2.3 g (97% yield) of dark brown polymer. The polymer was soluble in methane sulfonic acid from which it was reprecipitated by addition to an excess of methanol. The reprecipitated polymer had an intrinsic viscosity ($\eta$) of 1.3 as determined in methane sulfonic acid.

Analysis: Calc'd for $C_{26}H_8N_4SO_4$: C,66.10; H,1.70; N,11.85; Found: C,65.40; H,1.85; N,11.23.

EXAMPLE III

A mixture of 1.30 g (0.0044 mol) of 1,4,5,8-naphthalenetetracarboxylic acid dianhydride and 1.21 g (0.0044 mol) of 2,3,7,8-tetraaminodibenzothiophene-5,5-dioxide was added to 75 g of antimony trichloride. The mixture was slowly heated under a nitrogen atmosphere to 70°C whereupon the antimony trichloride melted and the reaction mixture became homogeneous. The reaction temperature was increased to 160°C and maintained at that temperature for 6 hours. The product was obtained by adding acetic acid to the cooled reaction mixture which caused the precipitation of a fine brown solid. The filtered product was washed with boiling acetic acid, methylene chloride and methanol. After drying, the product was dissolved in methane sulfonic acid and reprecipitated into excess methanol. The polylmer, 2.0 g (100% yield) had an intrinsic viscosity of 2.2 as determined in methane sulfonic acid.

Analysis: Calc'd for $C_{26}H_8N_4SO_4$: C,66.10; H,1.70; N,11.85; Found: C,65.20; H,2.00; N,11.10.

EXAMPLE IV

A sample of the polymer prepared as described in the preceding examples was subjected to thermogravimetric analysis. The data obtained are shown graphically in the drawing. Thus, the weight loss curves show a break in the region of 550°C in both air and nitrogen.

EXAMPLE V

A sample of the polymer prepared as described in Example II was used to prepare fibers. In the preparation of the fibers, a 4 percent solution of the polymer in methane sulfonic acid was extruded by means of a syringe into anhydrous methanol. The fibers that formed was dark brown in color.

EXAMPLE VI

A sample of the polymer prepared as described in Example II was used to fabricate films. The films were cast from methane sulfonic acid solution of the polymer by removal of the acid under reduced pressure (0.03 mm Hg) at 60°C. The films were dark in color while exhibiting a golden luster.

From the data in the foregoing examples, it is seen that the ladder polymers of this invention possess a high degree of thermal stability. Also, the examples demonstrate that the polymers can be readily synthesized and that they can be used in the preparation of fibers and films.

As will be apparent to those skilled in the art, modifications of the present invention can be made or followed in view of the foregoing disclosure without departing from the spirit and scope of the invention.

We claim:

1. 2,3,7,8-Tetraaminodibenzothiophene-5,5-dioxide.
2. A method for preparing 2,3,7,8-tetraaminodibenzothiophene-5,5-dioxide which comprises the following steps:
   a. adding 3,3'-dichlorobenzidine dihydrochloride to fuming sulfuric acid at a rate such as to maintain the resulting reaction mixture at a temperature in the range of 5° to 15°C;
   b. heating the reaction mixture of step (a) to a temperature of 50° to 100°C for a period of 10 to 20 hours;
   c. rapidly cooling the heated reaction mixture of step (b), thereby precipitating 2,8-dichloro-3,7-diaminodibenzothiophene-5,5-dioxide;
   d. adding trifluoroacticanhydride to methylene chloride containing hydrogen peroxide while maintaining the resulting mixture at a temperature below about 35°C;
   e. adding to the mixture of step (d) 2,8-dichloro-3,7-diaminodibenzothiophene-5,5-dioxide recovered from step (c) and refluxing the resulting reaction mixture for a period of 8 to 12 hours;
   f. cooling the reaction mixture of step (e), thereby crystallizing 2,8-dichloro-3,7-dinitrodibenzothiophene-5,5-dioxide from solution;
   g. adding 2,8-dichloro-3,7-dinitrodibenzothiophene-5,5-dioxide recovered from step (f), dioxane and concentrated ammonium hycroxide to a pressure vessel and heating the resulting reaction mixture at a temperature ranging from about 130° to 150°C for a period of about 12 to 20 hours;
   h. cooling the reaction mixture of step (g), thereby precipitating 2,8-diamino-3,7-dinitrodibenzothiophene-5,5-dioxide;
   i. adding 2,8-diamino-3,7-dinitrodibenzothiophene-5,5-dioxide to a solution of concentrated hydrochloric acid and heating the resulting reaction mixture to a temperature ranging from about 60° to 75°C for a period of about 3 to 6 hours;
   j. cooling the reaction mixture of step (i), thereby precipitating from solution the dihydrochloride salt of 2,3,7,8-tetraaminodibenzothiophene-5,5-dioxide; and
   k. suspending the dihydrochloride salt in deoxygenated water and adding ammonium carbonate thereto, thereby forming 2,3,7,8-tetraaminodibenzothiophene-5,5-dioxide.

* * * * *